(No Model.)
E. T. STEEN.
PIPE COUPLING.
No. 487,434. Patented Dec. 6, 1892.
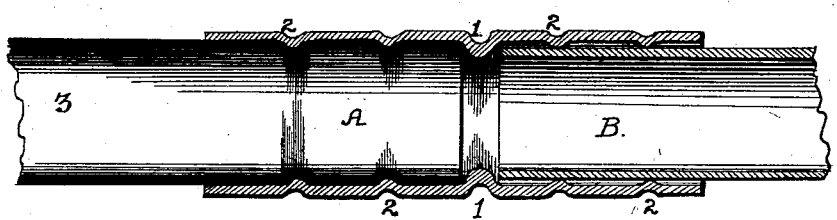
Witnesses
Geo. L. Clark
Fred E. Tasker,
Inventor
Edward T. Steen,
by F. B. Brock
Attorney

UNITED STATES PATENT OFFICE.

EDWARD TYLER STEEN, OF SAN FRANCISCO, CALIFORNIA.

PIPE-COUPLING.

SPECIFICATION forming part of Letters Patent No. 487,434, dated December 6, 1892.

Application filed December 4, 1890. Serial No. 373,584. (No model.)

*To all whom it may concern:*

Be it known that I, EDWARD TYLER STEEN, a citizen of the United States, residing at San Francisco, in the county of San Francisco and State of California, have invented certain new and useful Improvements in Pipe-Couplings; and I do declare the following to be a full, clear, and exact description of the invention, such as will enable others skilled in the art to which it appertains to make and use the same, reference being had to the accompanying drawing, and to the letters and figures of reference marked thereon, which form a part of this specification.

The figure represents a central vertical section of my improved pipe-coupling, showing a section of pipe inserted into each end of the coupling.

The invention relates to pipe-couplings.

The object of my improvement is to make a pipe-coupling which is cheap, simple, and effective.

My invention consists in the following method and construction, which will first be fully described in connection with the drawing, and the points of novelty then set forth in the claim.

In the drawing, A represents my improved coupling.

B is a section of tubing inserted in one end of the coupling.

1 is a central interior collar preferably pressed into the coupling around its periphery.

2 are one or more interior collars formed in the coupling A upon one or upon both sides of the central collar 1.

The collar 1 is made deep enough to form a stop for the pipe B when driven into the coupling. The ridges or collars 2 are compressed into the coupling, so that their diameter is slightly smaller than the tubes B driven therein. The collars 2 give way sufficiently when the pipe B is driven into the coupling to produce a tight joint which allows for the expansion and contraction of the metal and yet does not become loose and pull out. These collars also compensate for the slight variations in the external diameter of the driven pipe by their yielding to a degree commensurate with the size of the pipe—a result impossible to attain without the employment of such a means.

I claim—

A pipe-coupling consisting of a ring having a series of circumferential corrugations formed in the metal and producing alternate grooves and ribs or projections in the inner surface of the ring, with the middle corrugation of greater projection on the inside than the corrugations or projections on either side of it, substantially as described.

In testimony whereof I affix my signature in presence of two witnesses.

EDWARD TYLER STEEN.

Witnesses:
F. H. ROYCE,
JUSTICE U. HALEY.